Figure 1:
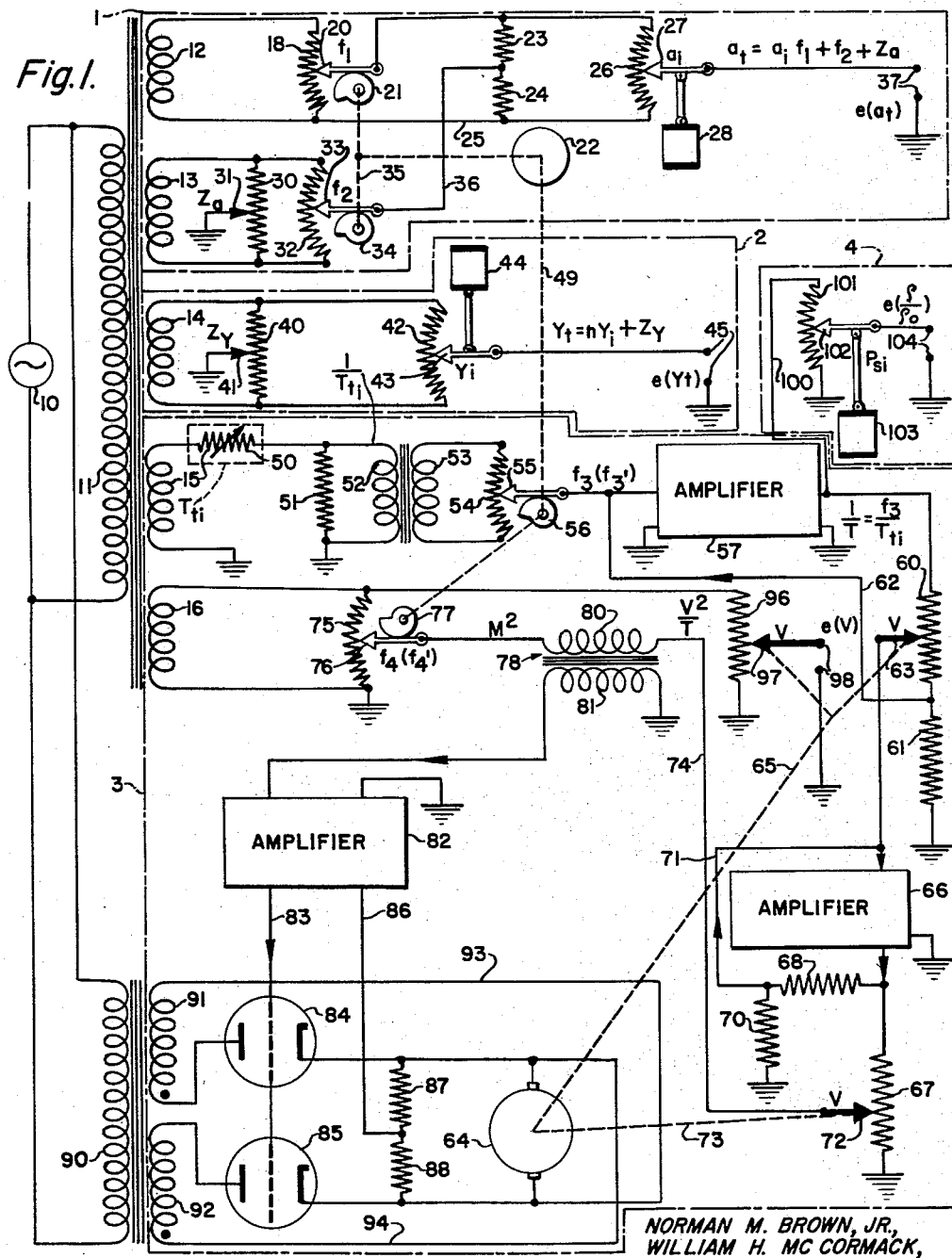

United States Patent Office 2,955,761
Patented Oct. 11, 1960

2,955,761

AIR DATA ANALOGUE COMPUTER

Norman M. Brown, Jr., Tarzana, and William H. McCormack, Torrance, Calif., assignors to The Garrett Corporation, Los Angeles, Calif., a corporation of California Filed May 12, 1954, Ser. No. 429,192

19 Claims. (Cl. 235—179)

This invention relates generally to computers, and particularly relates to an electronic analogue computer.

The analogue computer of the present invention is particularly adapted to develop output voltages representative at any instant of certain air data such, for example, as the angle of attack, the angle of yaw, the true air speed of an airplane and the relative density of the ambient air. The computer of the invention will be described in connection with such usage. It is to be understood, however, that the analogue computer of the present invention may be utilized generally for solving equations of a certain type. As is well known, it is frequently desirable to measure or indicate continuously the true angle of attack and angle of yaw of an airplane. For the same or similar purposes, it may also be desirable to continuously indicate or measure the true air speed, which is essentially the Mach number corrected for the temperature of the ambient air, as well as the relative air density. These data, which are continuously computed, are obtained from certain variables, such as the static and total air pressure, the relative direction of the air stream in elevation and in azimuth and the air temperature which may be measured continuously by suitable instruments well known in the art.

Accordingly, it is an object of the present invention to provide an improved and simplified electronic analogue computer.

Another object of the invention is to provide a simple analogue computer channel which permits derivation of voltages representative of both the true air speed and the relative density of the ambient air of an airplane.

A further object of the invention is to provide an analogue computer channel for computing the true air speed of an airplane which requires a minimum of components and amplifiers, thus reducing the weight of the computer and making it easier to adjust and to maintain in operative condition.

Still another object of the invention is to provide an improved, integrated analogue computer of the type referred to which utilizes the same measuring instrument in several of its channels to further simplify its construction.

Still a further object of the invention is to provide a relatively simple network for deriving an output voltage directly proportional to the reciprocal of the indicated or measured temperature of the ambient air.

The analogue computer of the present invention is essentially designed to solve an equation in which an unknown variable occurs in the second power. Each side or quantity of this equation is solved by a separate analogue network in which various factors are multiplied or divided, and the unknown variable may, for example, be multiplied into the network twice in succession. This may be effected by means of a servo amplifier and motor which may, for example, position sliders of potentiometers to satisfy the equation.

The equation is solved by making the voltage across an impedance element, such as a transformer, equal to zero by means of the servo motor. Consequently, the position of the servo motor indicates the desired variable. This variable may either be directly indicated by the position of the servo motor, or it may be introduced into another analogue network including, for example, a potentiometer having a variable slider positioned by the servo motor.

Furthermore, the computer of the invention includes an analogue network for developing an output voltage which is directly proportional to the reciprocal of the indicated or measured temperature of the ambient air. The provision of this network greatly simplifies the computer network for developing an output voltage indication of the true speed of the airplane and for developing an output voltage representative of the relative air density.

Figure 2:
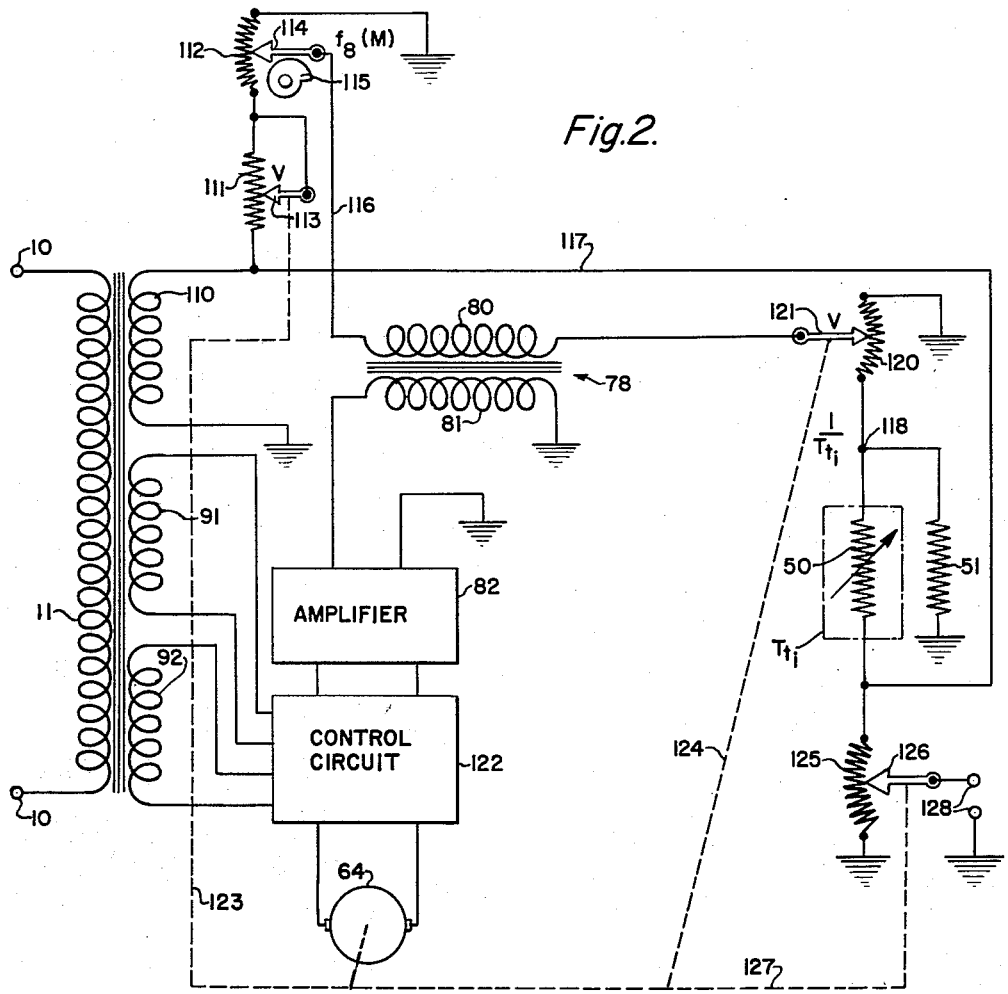

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Fig. 1 is a circuit diagram of an analogue computer embodying the present invention; and Fig. 2 is a circuit diagram of a modified analogue computer in accordance with the invention, for developing an output voltage representative of the true speed of the airplane.

Referring now to Fig. 1, there is shown an analogue computer having three separate channels enclosed by the dotted lines 1, 2 and 3. Channel 1 may be considered to be a separate analogue computer which develops an output voltage representative of the true angle of attack $a_t$. The true angle of attack may be defined as the vertical angle between the velocity vector of the airplane and a horizontal reference plane through the frame of the airplane. Similarly, the computer channel 2 may be considered a separate analogue computer which develops an output voltage representative of the true angle of yaw $y_t$. The true angle of yaw is the horizontal angle between the velocity vector of the airplane and a vertical reference plane through the frame of the airplane. Finally, the third computer channel 3 may also be considered a separate analogue computer which develops an output voltage representative of the true air speed V.

The electric circuit enclosed by the dotted line 4 may be added to the true air speed computer 3 and is utilized for developing an output voltage representative of the relative air density. The relative air density may be defined as $$\frac{\rho}{\rho_0}$$

wherein $\rho$ indicates the absolute density of the ambient air of the airplane, while $\rho_0$ indicates a reference air density and may correspond to the density of air at a pressure of 29.92″ of mercury at a temperature of $+15°$ centigrade. As will be explained hereinafter, the computer channels enclosed by the dotted lines 1, 2, 3 and 4 are inter-related and make use of common components, thereby to simplify the air data computer of the invention.

All the computer channels have a common source of alternating voltage indicated at 10. By way of example, the voltage source 10 may develop an alternating voltage of 115 volts ±1% at a frequency of 400 cycles per second ±0.1%. Since the output voltage developed by the various computer channels will vary with the input voltage, for some applications the input voltage should be maintained within the indicated limits. A primary winding 11 is connected across the voltage source 10 and a number of secondary windings 12, 13, 14, 15 and 16 are magnetically coupled, as indicated, to the primary winding 11. The angle of attack computer 1, which will now be explained, includes secondary windings 12 and 13. A resistor 18 is connected across the secondary winding 12 and is arranged to provide a potentiometer having a variable tap 20. The variable tap 20 may, for example, be controlled by a cam 21, which is actuated as indicated by dotted lines 35 by an instrument schematically indicated at 22. As will be more fully explained hereinafter, the instrument 22 may be a pressure ratio measuring instrument for positioning the cam 21 in accordance with the ratio of certain air pressures.

A pair of resistors 23 and 24 is connected between the variable tap 20 and a lead or conductor 25 connected to one terminal of the secondary winding 12 and resistor 18. Another resistor 26 is connected in parallel with the resistors 23 and 24 and forms another potentiometer having a variable tap 27 which may be controlled by an instrument schematically indicated at 28.

A resistor 30 is connected across the secondary winding 13 and has a grounded adjustable tap 31. A resistor 32 forming a potentiometer with its variable tap 33 is connected across the resistor 30. The variable tap 33 may be controlled by a cam 34 which is actuated by the pressure ratio instrument or transducer 22, as shown by the dotted lines 35. By means of lead 36 the variable tap 33 is connected to the junction point of resistors 23 and 24.

The angle of attack computer, as described hereinbefore, is designed to develop an output voltage function $e(a_t)$ which is representative of the true angle of attack $a_t$. The true angle of attack is obtained from the following equation:

$$a_t = a_i f_1(M) + f_2(M) + Z_a \quad (1)$$

In Equation 1 $a_i$ is the indicated or measured angle of attack, that is, the angle of attack of the airplane as determined by the local air flow. This indicated angle of attack may be obtained by the instrument indicated at 28 which may be of conventional construction. $f_1(M)$ and $f_2(M)$ are corrections of the indicated angle of attack which are functions of the Mach number. The Mach number M may be defined as follows:

$$M = \frac{V}{V_c} \quad (2)$$

wherein $V_c$ is the speed of sound at the temperature of the ambient air of the plane.

These functions of the Mach number, that is, $f_1$ and $f_2$ are obtained by means of the instrument indicated at 22, which measures the ratio of the indicated static pressure $P_{si}$ to the indicated total pressure $P_{ti}$. These two functions $f_1$ and $f_2$ correct for position errors of the instruments with respect to the aircraft and are usually determined by flight test of the particular airplane for which the computer is to be used.

Finally, $Z_a$ is a boresight correction for elevation, and this correction is a constant for each particular airplane. The correction or adjustment for $Z_a$ is accomplished upon installation of the entire computer system in an aircraft, and corrects for misalignment errors in the aircraft which may be caused by aircraft tolerances. Hence, this correction or adjustment need normally only be made upon installation of the computer in a particular aircraft.

The computer channel 1 computes the true angle of attack in accordance with Equation 1. The pressure ratio measuring instrument or transducer positions cam 21 in accordance with $f_1$ and hence the voltage impressed across resistors 23 and 24 will vary in accordance with $f_1$. This may readily be explained in the following manner. Assuming E to be the voltage developed across winding 12 and assuming further the total resistance of resistor 18 to be $R_1$, and the resistance of resistor 18 between tap 20 and conductor 25 to be $R_2$. Accordingly, the output voltage between variable tap 20 and conductor 25 is $$\frac{ER_2}{R_1}$$

Since both E and $R_1$ are constant, the output voltage is directly proportional to $R_2$ which in turn is made proportional to $f_1$. The factor $$\frac{E}{R_1}$$

amounts to a scale factor which can be taken into consideration when designing the analogue network.

The voltage between variable tap 20 and conductor 25, which is proportional to $f_1$, is now multiplied by $a_i$ in the same fashion as explained hereinbefore by the potentiometer 26, 27. This is due to the fact that the variable tap 27 is moved by the instrument 28 in accordance with the indicated or measured angle of attack as determined by the local air flow. An angle of attack transducer such as indicated at 28 is well known in the art. Thus, as explained so far, the voltage between variable tap 27 and a point of reference potential designated as the common connection point between resistors 23 and 24 is representative of $a_i, f_1$. In accordance with Formula 1, it is still necessary to add $f_2$ and $Z_a$ to this voltage. This is effected by the bridge network including resistors 30 and 32. The grounded adjustable tap 31 of resistor 30 is adjusted in accordance with the boresight correction. On the other hand, the variable tap 33 is controlled by the cam 34 in accordance with $f_2$. This voltage representing both $Z_a$ and $f_2$ is added by means of lead 36 to the junction point of resistors 23 and 24. Consequently, the summed voltage comprising the sum of the output voltages of two independent bridges appearing at tap 27 with respect to ground is representative of $a_t$ in accordance with Formula 1. It will be understood that the correction factors $f_2$ and $Z_a$ may be either positive or negative, and hence the voltage obtained from tap 33 may be made either positive or negative with respect to ground. Consequently, the voltage $e(a_t)$ available at the output terminals 37 is representative of the true angle of attack and may be used either to indicate the true angle of attack or for other computations as is well known in the art.

The angle of yaw computer 2 operates somewhat similar to the angle of attack computer 1. The angle of yaw is determined in accordance with the following equation:

$$y_t = ny_i + Z_y \quad (3)$$

In the above equation $y_i$ is the indicated or measured angle of yaw, that is, the angle of yaw as determined by the local air flow. $n$ is a constant, the value of which depends on the location of the instrument for measuring the local air flow or the air stream direction, and may conveniently be determined by flight test. $Z_y$ is a boresight correction factor for the azimuth. This correction factor is taken into consideration by an adjustment effected similar to that for the boresight correction for elevation.

The analogue computer 2 is designed to indicate the true angle of yaw in accordance with Formula 3. To this end a resistor 40 is connected across the secondary winding 14 and has an adjustable tap 41 which is grounded. By means of the tap 41, the boresight correction $Z_y$ may be accomplished. Another resistor 42 is connected across the resistor 40 and forms a potentiometer with its variable tap 43, which may be controlled by an instrument indicated at 44 which measures the air stream direction for azimuth. The network described so far will add $Z_y$ to the indicated angle of yaw $y_i$. The voltage across the resistor 42 may be arranged so that the output voltage between variable tap 43 and the lower terminal of the resistor 42 is proportional to $ny_i$. Accordingly, the voltage between variable tap 43 and ground obtained from output terminals 45 is proportional to $y_t$ in accordance with the Formula 3 and this voltage may be designated $e(y_t)$.

While the computer networks 1 and 2 will develop respectively a voltage indicative of the angle of attack and the angle of yaw, the analogue computer 3 is designed to develop a voltage representative of the true air speed V. The true air speed V may be obtained from the following equation:

$$V = kM\sqrt{T} \qquad (4)$$

In the above formula, $k$ is a scale factor constant which determines the units of the true air speed V, while M is the Mach number as previously defined. T is the temperature of the ambient air in degrees Kelvin. Formula 4 may be rewritten as follows:

$$M^2 = \frac{V^2}{Tk^2}$$

$k$, or $k^2$ may be considered a scale factor which may be taken into consideration by properly designing the computer network and hence the above formula may be rewritten as follows:

$$M^2 \propto \frac{V^2}{T} \qquad (5)$$

The Mach number M may be obtained as a function of the ratio of the indicated static pressure $P_{si}$ and the indicated total pressure $P_{ti}$ which may be expressed as follows:

$$M \equiv \frac{V}{V_c} = g\left(\frac{P_{si}}{P_{ti}}\right)$$

Thus, as will be explained hereinafter, M may be obtained from the pressure ratio transducer 22 by means of a suitable cam.

In order to solve Equation 5, it is still necessary to obtain T and this may be done from the following equation:

$$\frac{1}{T} = \frac{1}{T_{ti}}(1 + .2M^2)f_6(M) = \frac{1}{T_{ti}}f_3(M) \qquad (6)$$

In Formula 6 $T_{ti}$ is the total or stagnation temperature of the ambient air of the airplane in degrees Kelvin. This temperature may be measured with a temperature measuring instrument or temperature transducer. $f_3$ is defined by Formula 6, while $f_6$ is a correction factor which is a function of the Mach number as indicated. This correction factor $f_6$ is composed primarily of two Mach dependent factors, a position error which has to do with the relative position of the temperature transducer and the temperature recovery factory which depends on the particular construction of the transducer and may be made to approach unity. Hence, it will be appreciated that the factor $f_3$ may also be obtained by means of cam operated by the pressure ratio transducer 22 which may be considered to measure essentially the Mach number M.

The analogue computer 3 is designed to evaluate V as defined by Formula 5 which may be rewritten as follows:

$$M^2 \propto f_4(M) \propto \frac{V^2 f_3(M)}{T_{ti}} \qquad (7)$$

which follows from Equation 6. $f_4(M)$ is defined by Equation 7.

The analogue computer 3, which solves Equation 7, will now be explained. A resistor 50 is connected in series with a resistor 51 and the secondary winding 15, one terminal of the winding being grounded as shown, as well as one terminal of the resistor 51. As will be pointed out hereinafter, the network 50, 51 is arranged in such a manner that the combined resistance of the two resistors is made directly proportional to the temperature $T_{ti}$ in degrees Kelvin so that the voltage across the resistor 51 is proportional to $$\frac{1}{T_{ti}}$$

since the voltage across resistor 51 will decrease, for example, as a reciprocal function of temperature increase, as the resistance of resistor 50 increases directly with increase of temperature.

In the equations to be derived below, certain valid assumptions or definitions of terms are made as follows:

$E_1$ = voltage across winding 15;
$R_3$ = resistance of variable resistor 50 (resistor 50 being temperature responsive);
$R_4$ = resistance of fixed resistor 51.

Proceeding from this, we may use the general form of an equation for temperature sensitive alloys as follows:

$$R|_T = R|_{T_0}(1 + \alpha_0[T - T_0])$$

As is well known, in the above equation $R_T$ is the resistance at a temperature T, while $R_{T_0}$ is the resistance at the starting temperature, while $\alpha_0$ represents essentially the temperature coefficient of resistance at the starting temperature. Substituting $k_1$ for the coefficient $\alpha_0$ it is obvious that the general form of the equation will then read as follows:

$$R_3 = R_0(1 + k_1[T - T_0]) \qquad (8)$$

This equation may be rewritten as follows:

$$R_3 = R_0 - R_0 k_1 T_0 + R_0 k_1 T \equiv k_2 + k_3 T \qquad (9)$$

It will be obvious from the above equations that $R_0$ is the resistance of resistor 50 when T, the variable temperature, equals $T_0$, a fixed temperature. $k_1$, $k_2$ and $k_3$ are, of course, constants defined by the above formulas, $k_2$ and $k_3$ being substituted for the constant terms $(R_0 - R_0 k_1 T_0)$ and $(R_0 k_1)$, respectively, in Equation 9. It will also be obvious that Equation 9 defines a straight line having a slope given by $k_3$, while $k_2$ indicates the resistance for zero temperature.

Actually, the combined resistance $(R_3 + R_4)$ should be directly proportional to the temperature T (or $T_{ti}$). To this end we assume $R_4 = -k_2$ and consequently:

$$R_3 + R_4 = k_3 T \qquad (10)$$

Since the resistance of resistor 51 cannot conveniently be made negative, it follows that $k_2$ itself must be negative so that $R_4$ will be positive. $k_2$ has been defined hereinabove as follows:

$$k_2 = R_0 - R_0 k_1 T_0 = R_0(1 - k_1 T_0) \qquad (11)$$

Since $k_2$, as defined by Equation 11, should be negative, and since $R_0$ is positive, it follows that $k_1 T_0$ must be greater than 1:

$$k_1 T_0 > 1 \qquad (12)$$

It will now be seen that the resistance $R_3$ of resistor 50 must be selected to satisfy Equation 12, while the resistance $R_4$ of resistor 51 must satisfy Equation 10, that is, $R_4 = -k_2$.

The voltage across resistor 51 is now equal to $$\frac{E_1 R_4}{R_3 + R_4}$$

This expression becomes $$\frac{-E_1 k_2}{k_3 T} = \frac{k_4}{T}$$

In other words this voltage is directly proportional to $$\frac{1}{T}$$

It may be pointed out that normally the resistance of a resistor will not vary directly in proportion to the temperature even if the required temperature range should be comparatively small. In accordance with the present invention, the resistor 50 may consist of a suitably wound copper wire which may have a resistance of the order of 1000 ohms. The resistance of resistor 51 should be suitably selected in accordance with the above equations and may, for example, amount to 160 ohms.

The voltage across resistor 51, which is directly proportional to $$\frac{1}{T_{tt}}$$

is impressed on the primary winding 52 of a transformer having a secondary winding 53. The transformer 52, 53 may be a step-up transformer so as to amplify the output voltage. This amplified voltage across secondary winding 53, which is still directly proportional to $$\frac{1}{T_{tt}}$$

is now multiplied by the Mach function $f_3$. This is effected by a potentiometer including a resistor 54 connected across the secondary winding 53 and a variable tap 55 which may be controlled by a cam 56. The cam 56 is positioned by the same pressure ratio transducer 22 which was utilized in the angle of attack computer channel 1 as shown by the dotted line 49. Thus the voltage obtained from variable tap 55 is proportional to $$\frac{f_3}{T_{ti}} = \frac{1}{T}$$

in accordance with Equation 6.

The voltage obtained from variable tap 55 is impressed on a conventional amplifier 57, the main function of which is to provide voltage gain and impedance isolation between the input and output circuits of the amplifier. The amplifier 57 has an output circuit, including a pair of resistors 60 and 61 connected serially between the amplifier output and ground. The junction point of resistors 60 and 61 may be connected to the amplifier input circuit by means of the lead 62 to provide a negative feedback path. The negative feedback serves the purpose of stabilizing the amplifier in a manner well known in the art. However, it is to be understood that the amplifier 57 need not be provided with a negative feedback connection. Amplifier 57 may have a high input impedance and an output impedance which may be a fraction of an ohm by virtue of a cathode follower output and the negative feedback loop.

The voltage $$\frac{1}{T}$$

obtained from amplifier 57 is now multiplied by V, the true air speed. To this end a variable tap 63 is provided on the resistor 60 to effect the multiplication by V. The variable tap 63 is positioned by an electric direct current (D.C.) motor 64 as indicated by the dotted line 65 in a manner to be explained hereinafter.

The voltage obtained from variable tap 63 is now proportional to $$\frac{V}{T}$$

This voltage is again multiplied by V by the subsequent network which includes another conventional amplifier 66 having an output circuit which includes a resistor 67 connected between the amplifier output and ground. A pair of resistors 68 and 70 is connected across resistor 67 and the junction point of the resistor 68, 70 is connected through lead 71 to the amplifier input circuit to provide again a negative feedback connection. The amplifier 66 again serves the purpose of providing voltage gain and impedance isolation between the amplifier input circuit and output circuit and its gain is stabilized by the negative feedback connection. A variable slider 72 on resistor 67 effects the multiplication by V and is controlled from motor 64 as indicated by the dotted line 73.

The voltage obtained from lead 74 connected to variable tap 72 is, accordingly, proportional to $$\frac{V^2}{T}$$

In accordance with Formula 5, this term should be equal to $M^2 \equiv f_4$. In accordance with the present invention, the quantity $$\frac{V^2}{T}$$

is compared to $M^2$, which is obtained in another network including the secondary winding 16. A resistor 75 is connected across the secondary winding 16 and a common junction point is grounded. A variable tap 76 is controlled by a cam 77, which in turn is positioned by the pressure ratio transducer 22 as indicated. Hence the voltage obtained from variable tap 76 is proportional to $f_4$ which, by definition, is $M^2$.

The voltage obtained from lead 74 which is proportional to $$\frac{V^2}{T}$$

and the voltage obtained from variable tap 76 which is proportional to $M^2$ are compared by means of a transformer 78 having a primary winding 80 and a secondary winding 81. In order to satisfy Formula 5, the voltage across the primary winding 80 should be zero. Since one terminal of secondary winding 81 is grounded, the voltage at the other terminal of secondary winding 81 should be at ground potential to satisfy the equation. To this end the term V in Equation 5 is treated as a variable. In other words, the variable taps 63 and 72 are adjusted in unison until the voltage at the ungrounded terminal of secondary winding 81 becomes equal to ground potential.

This is effected by a servo amplifier for controlling the D.C. motor 64. An amplifier 82 is connected across the secondary winding 81. The amplifier output obtained from lead 83 is impressed on the control grids of a pair of motor control tubes 84 and 85. The return connection is effected through the amplifier lead 86, which is connected to the junction point of a pair of resistors 87 and 88 connected serially between the cathodes of the motor control tubes 84 and 85.

The motor control tubes 84 and 85 are energized by two separate alternating current sources. To this end, the alternating current source 10 is connected across the primary winding 90 of a transformer having a pair of secondary windings 91 and 92 and the secondary windings may be considered to be two separate alternating current sources. The lower terminal of secondary winding 91 is connected to the anode of motor control tube 84, while the other terminal of secondary winding 91 is connected through lead 93 to the cathode of motor control tube 85. Similarly, the lower terminal of the secondary winding 92 is connected through a lead 94 to the cathode of motor control tube 84, while the other terminal of secondary winding 92 is connected to the anode of motor control tube 85. The two secondary windings 91 and 92 are wound in such a manner that the two anodes are energized in push-pull as indicated by the dots on the secondary windings. The electric motor 64 is connected between the leads 93 and 94, that is, directly between the cathodes of the two motor control tubes 84 and 85.

Accordingly, the direction of rotation of the motor 64 is determined by the phase of the signal impressed on the control grids of the tubes 84 and 85 with respect to the phase of the voltage impressed on their anodes. Let it be assumed that the phase of the signal is such that motor control tube 84 conducts whenever its anode is positive. The current will, accordingly, flow from winding 91 through tube 84 through motor 64 and back to the winding through lead 93. Hence, the motor 64 will rotate in one direction. Assuming now that the phase of the signal is such that tube 85 is rendered conducting during the positive cycles of the voltage impressed on its anode. The current will accordingly flow from winding 92 through tube 85, motor 64 and back to the winding through lead 94. Hence the motor 64 is rotated in the opposite direction since the direction of current flow is reversed. The motor 64 will continue to rotate in the proper direction until the voltage across the secondary winding 81 becomes zero to satisfy Equation 5. The motor control circuit has been disclosed and claimed in the co-pending application of William H. McCormack and Cyrus R. Olson, Serial No. 390,824, filed on November 9, 1953, and entitled, "Motor Control Circuit."

The variable taps 63 and 72 will be adjusted or raised in unison by the motor 64 to satisfy Equation 5. Hence the desired value of V, the true air speed, may be obtained, for example, from the angular position of the shaft of motor 64. As shown in the drawing, this value of V may be transformed into a corresponding voltage $e(V)$ by another analogue network. To this end, the resistor 96 may be connected across the secondary winding 16, which functions as a voltage source for the resistor 96. It will, of course, be understood that a separate winding may be provided for the resistor 96. The resistor 96 forms a potentiometer with its variable tap 97 which is controlled by the electric motor 64 as indicated by the dotted line 65. Hence the voltage obtained from output terminals 98 is the desired voltage $e(V)$ which is representative of the true air speed V.

In accordance with the present invention it is also feasible to obtain the relative density of the ambient air by means of the computer channel 4, which may be connected to the computer channel 3 for developing a voltage representative of the relative air density. The computer channel 4 develops a voltage representative of $$\frac{\rho}{\rho_0}$$

wherein $\rho$ is the absolute density of the ambient air, while $\rho_0$ is a reference air density which may correspond to a pressure of 29.9" of mercury at a temperature of $+15°$ centigrade. The computation of the relative air density is based on the following formula:

$$\frac{\rho}{\rho_0} = \frac{P_s T_0}{T P_{so}} \qquad (13)$$

In the above equation $P_s$ is the true static air pressure at the flight altitude, while $P_{so}$ is a reference static pressure which is again taken at an air pressure of 29.92" of mercury and at a temperature of $+15°$ centigrade. $T_0$ is a reference air temperature which is taken at 288° Kelvin=$+15°$ centigrade.

The above Formula 13 may now be transformed as follows:

$$\frac{\rho}{\rho_0} = \frac{P_s T_0}{T P_{so}} = \frac{k_3}{T} f_7(M) P_{si} \propto \frac{f_7}{T} P_{si} \qquad (14)$$

In the above formula the term $k_3$ which equals $T_0/P_{so}$ has been omitted because this term is constant and determines the numerical values of the units and may be taken care of by proper design of the analogue network. In the above formula $$f_7 = \frac{P_s}{P_{si}}$$

It will now be seen that the voltage representative of $$\frac{1}{T}$$

which is obtained from the output of amplifier 57 may be utilized for deriving $$\frac{\rho}{\rho_0}$$

provided the term $$\frac{1}{T}$$

is multiplied by $P_{si}$. However, as will be seen from Formula 14, there is still a factor $f_7$ to be taken into consideration.

In accordance with the present invention, this may be simply effected by multiplying the left hand term and the right hand term of Equation 5 with the function $f_7$. Thus Formula 5 may be rewritten as follows:

$$f_4' \propto M^2 f_7 \propto \frac{V^2}{T} f_7 \qquad (15)$$

The above equation defines $f_4'$. The right hand term or quantity of Formula 15 may be rewritten as follows:

$$\frac{V^2}{T} f_7 = \frac{V^2}{T_{ti}} f_3 f_7 = \frac{V^2}{T_{ti}} f_3' \qquad (16)$$

The above formula defines $f_3'$.

Thus the cams 56 and 77 which represent the functions $f_3$ and $f_4$, respectively, may be exchanged with other cams which will yield respectively the functions of $f_3'$ and $f_4'$ as indicated in the drawing. In that case the voltage obtained from the output of amplifier 57 is proportional to $$\frac{f_7}{T}$$

which may be obtained from the lead 100 connected to the amplifier output. A resistor 101 is connected across the amplifier output, that is, between output lead 100 and ground. The variable tap 102 on the resistor 101 is now controlled in accordance with $P_{si}$ which may be effected by a static pressure measuring instrument schematically indicated at 103. Hence, the voltage obtained from variable tap 102 corresponds to $$\frac{f_7}{T} P_{si}$$

which, in accordance with Formula 14, equals $$\frac{\rho}{\rho_0}$$

The output voltage $$e\left(\frac{\rho}{\rho_0}\right)$$

is obtained from output terminals 104 connected between variable tap 102 and ground.

It will be understood that the computer channel 4 may be omitted if desired. The analogue computer of the present invention thus permits the development of voltages representative of true angle of attack, of the true angle of yaw, of the true air speed and of the relative air density. All these data are obtained with a comparatively simple analogue network requiring a minimum of amplifiers. The pressure ratio transducer 22 is utilized in both the angle of attack channel and the true air speed channel, thus further simplifying the computer. By means of a simple servo amplifier and D.C. motor, the true air speed is found by a nulling method and is used to obtain a voltage representative of the true air speed. Since it is possible to derive a voltage proportional to $$\frac{1}{T}$$

a voltage representative of the relative air density may be obtained by the addition of a very few circuit components and a static pressure measuring instrument.

Referring now to the modification shown in Fig. 2, wherein like elements have been designated by the same reference characters as in Fig. 1, there is illustrated an analogue computer for developing an output voltage representative of the true air speed V. The computer of Fig. 2 again makes use of Formula 5, or Equation 7 which, however, may be rewritten as follows:

$$\frac{f_8(M)}{V} \propto \frac{V}{T_{ti}} \qquad (17)$$

In the above formula $$f_8(M) = \frac{f_4(M)}{f_3(M)}$$

this follows Equation 7.

The analogue computer of Fig. 2 again develops two voltages, one being proportional to $$\frac{V}{T}$$

while the other one is proportional to $$\frac{f_8}{V}$$

and the two voltages are compared by means of a transformer. The computer of Fig. 2 includes an alternating current source 10 connected across the primary winding 11 with a transformer having a secondary winding 110 which supplies alternating voltage to the computer. One terminal of secondary winding 110 is grounded while the other one is connected to a resistor 111 and a second resistor 112 connected in series and grounded as shown. The junction point of resistors 111 and 112 is connected to a variable tap 113 on resistor 111 which may be moved in accordance with V. Resistor 112 forms part of a potentiometer having a variable tap 114, the position of which is controlled by a cam 115 in accordance with the Mach number. Accordingly, the cam 115 may be controlled by the pressure ratio measuring instrument as explained hereinbefore.

The variable tap 114 is connected through lead 116 to one terminal of winding 80 forming part of the transformer 78 which is utilized for comparing the voltage of the loop 111, 112 with that developed by the other loop of the computer. The ungrounded terminal of secondary winding 110 is further connected through a lead 117 to the resistor 50, the resistance of which varies with the temperature $T_{t1}$ in the manner previously explained. Resistor 51 is connected between the terminal 118 of resistor 50 and ground. Accordingly, in the manner previously explained, the junction point 118 of resistors 50, 51 carries a voltage which is proportional to $$\frac{1}{T_{t1}}$$

Another resistor 120 is connected between junction point 118 and ground and is provided with a variable tap 121 which is varied in accordance with V.

The transformer 78 again includes another winding 81 having one terminal grounded, while the other terminal is connected to amplifier 82. The output of amplifier 82 is connected to a control circuit 122 which may be identical to the control circuit including tubes 84 and 85 as shown in Fig. 1. These tubes may be energized by secondary windings 91 and 92 in the manner previously explained for controlling the direction of rotation of the electric motor 64. As indicated by the dotted lines 123 and 124, the variable taps 113 and 121, respectively, are controlled by the electric motor 64. Thus, these two variable taps 113 and 121 are moved until the voltage across transformer winding 80 becomes zero.

The operation of the analogue computer of Fig. 2 will now be explained. The tap 114 is positioned by its cam 115 in accordance with the function $f_8$. Thus the voltage obtained from lead 116 is proportional to $f_8$. This voltage is divided by a voltage proportional to V which is obtained by positioning of the tap 113. Hence, the voltage obtained from lead 116 is indicative of $$\frac{f_8}{V}$$

As explained before, the voltage at junction point 118 is $$\frac{1}{T}$$

and this voltage is multiplied by V by means of the potentiometer 120, 121. Hence, the other terminal of winding 80 is supplied with a voltage $$\frac{V}{T}$$

These two voltages are now compared and the motor 64 is energized until the voltage across transformer winding 80 becomes zero.

Accordingly, the position of motor 64 will indicate V, the quantity to be determined. It is feasible to develop an electric output voltage proportional to V. To this end a resistor 125 may be connected across secondary winding 110 and a variable tap 126 of the resistor 125 may be positioned by the motor 64 as indicated by the dotted line 127. The voltage obtained from output terminals 128 connected between tap 126 and ground will then be indicative of V.

It will be noted that the analogue computer of Fig. 2 is further simplified with respect to that of Fig. 1 and does not require amplifiers in the two loops of the computer. Instead of multiplying twice in succession by V in one of the computer loops, the circuit of Fig. 2 makes use of a formula wherein the quantity V occurs once in each of the two loops. Thus the computer shown in Fig. 2 represents a further improvement and simplification over that of Fig. 1.

What is claimed is:

1. An electronic analogue computer for continuously computing an equation having a first quantity which must equal a second quantity, said equation including an unknown variable occurring in the second power, said computer including a closed loop having a first portion and a second portion, a first voltage source, a second voltage source, means to vary the output of said first voltage source in accordance with a variable condition, said first loop portion being coupled to the variable output of said first voltage source and including at least one network for evaluating said first quantity, said second loop portion being coupled to said second voltage source and including at least another network for evaluating said second quantity, an impedance element coupling said first loop portion to said second loop portion, whereby the voltage across said impedance element must be zero to satisfy said equation, a servo motor, means coupled across said impedance element for controlling said servo motor in accordance with the voltage across said impedance element, said loop including first and second potentiometer means, at least one of said potentiometer means being included in said first loop portion, and said servo motor being coupled to both of said potentiometer means for controlling said potentiometer means in unison in accordance with said variable, thereby to vary said potentiometer means until the voltage across said impedance element becomes zero.

2. A computer according to claim 1 in which said first and second potentiometer means are included in one of said loop portions.

3. A computer according to claim 1 in which one of said loop portions includes one of said potentiometer means and the other of said loop portions includes the other of said potentiometer means.

4. An electronic analogue computer for continuously computing an equation including an unknown variable term V to the second power, wherein V is the true speed of an airplane, said equation further including at least one term which is a function of the temperature of the ambient air and at least another term which is a function of the Mach number evaluated as a function of the ratio of the static pressure of the ambient air to the dynamic pressure of the ambient air, said equation including all of said terms and having a first quantity which must equal a second quantity to satisfy said equation, thereby to determine the value of V; said computer comprising a closed loop having a first portion and a second portion;

a first voltage source, a second voltage source, means to vary the output of said first voltage source in accordance with a variable condition; said first loop portion being arranged to evaluate said first quantity and being coupled to the variable output of said first voltage source and including at least one network for evaluating at least one of said terms, said second loop portion being arranged to evaluate said second quantity and being coupled to said second voltage source and including at least another network for evaluating at least another one of said terms; an impedance element coupling said first loop portion to said second loop portion, whereby the voltage across said impedance element must be zero to satisfy said equation; a servo motor; and means coupled across said impedance element for controlling said servo motor, said loop including first and second potentiometer means each being adapted to be positioned in accordance with V, at least one of said potentiometer means being included in said first loop portion, said motor being coupled to both of said potentiometer means for varying in unison said potentiometer means to satisfy said equation.

5. An air data analogue computer for continuously solving the equation $$M^2 = \frac{f_3(M)}{T_{ti}} V^2$$

wherein M is the Mach number, $f_3M$ is a predetermined function of M, $T_{tt}$ is the indicated total temperature of the ambient air, and V the speed of an airplane; said computer comprising a closed loop including a first portion and a second portion; a source of alternating voltage; said first loop portion being coupled to said source and having a first network including circuit means for developing an output voltage representative of $$\frac{1}{T_{tt}}$$

a second network coupled to said first network and including first potentiometer means, an instrument for measuring an air pressure ratio, said instrument being coupled to said first potentiometer means for multiplying the input voltage of said second network by $f_3(M)$, a third and a fourth network coupled in cascade to said second network, said third and fourth networks including respectively second and third potentiometer means; a servo motor for controlling said second and third potentiometer means in accordance with V; said second loop portion being coupled to said source and including fourth potentiometer means coupled to said instrument for developing an output voltage representative of $M^2$; an impedance element coupling said second loop portion to the fourth network of said first loop portion; and means for controlling said servo motor in accordance with the voltage across said impedance element, whereby said second and third potentiometer means are adjusted until the voltage across said impedance element becomes zero.

6. An airborne air data analogue computer for continuously solving the equation $$M^2 = \frac{f_3(M)}{T_{ti}} V^2$$

and for indicating the variable V, wherein M is the Mach number, $f_3(M)$ is a predetermined function of M, $T_{tt}$ is the indicated total temperature of the ambient air, and V the speed of an airplane; said computer comprising a closed loop including a first portion and a second portion; a source of alternating voltage; said first loop portion being coupled to said source and having a first network including circuit means for developing an output voltage representative of $$\frac{1}{T_{tt}}$$

a second network coupled to said first network and including first potentiometer means, an instrument for measuring an air pressure ratio, said instrument being coupled to said first potentiometer means for multiplying the input voltage of said second network by $f_3(M)$, a third and a fourth network coupled in cascade to said second network, said third and fourth networks including respectively second and third potentiometer means; a servo motor for controlling said second and third potentiometer means in accordance with V; said second loop portion being coupled to said source and including fourth potentiometer means coupled to said instrument for developing an output voltage representative of $M^2$; an impedance element coupling said second loop portion to the fourth network of said first loop portion; a servo amplifier for controlling said servo motor in accordance with the voltage across said impedance element, whereby said second and third potentiometer means are adjusted until the voltage across said impedance element becomes zero; and means coupled to said servo motor for indicating the variable V.

7. An airborne air data analogue computer for continuously solving the equation $$M^2 = \frac{f_3(M)}{T_{ti}} V^2$$

and for indicating the variable V, wherein M is the Mach number, $f_3(M)$ is a predetermined function of M, $T_{tt}$ is the indicated total temperature of the ambient air, and V the speed of an airplane; said computer comprising a closed loop including a first portion and a second portion; a source of alternating voltage; said first loop portion being coupled to said source and having a first network including circuit means for developing an output voltage representative of $$\frac{1}{T_{tl}}$$

a second network coupled to said first network and including first potentiometer means, an instrument for measuring ratio of the static air pressure to the dynamic air pressure, said instrument being coupled to said first potentiometer means for multiplying the input voltage of said second network by $f_3(M)$, a third and a fourth network coupled in cascade to said second network, said third and fourth networks including respectively second and third potentiometer means, a servo motor for controlling said second and third potentiometer means in accordance with V; said second loop portion being coupled to said source and including fourth potentiometer means coupled to said instrument for developing an output voltage representative of $M^2$; an impedance element coupling said second loop portion to the fourth network of said first loop portion; a servo amplifier for controlling said servo motor in accordance with the voltage across said impedance element, whereby said second and third potentiometer means are adjusted until the voltage across said impedance element becomes zero; and fifth potentiometer means coupled to said source and to said servo motor for developing an output voltage indicative of the variable V.

8. An airborne air data analogue computer for continuously solving the equation $$M^2 f_7(M) = f_4'(M) = \frac{f_3'(M)}{T_{ti}} V^2$$

and for indicating the variable V, wherein M is the Mach number, $f_3'(M)$, $f_7(M)$ and $f_4'(M)$ are functions of M, $T_{tt}$ is the indicated total ambient air temperature, and V the speed of an airplane, and for solving the equation $$\frac{p}{p_0} = \frac{f_3'(M)}{T_{ti}} P_{si}$$

and for indicating $$\frac{p}{p_0}$$

where $\rho$ is the density of the ambient air, $\rho_0$ is a standard air density, and $P_{si}$ is the indicated static pressure of the ambient air; said computer comprising a closed loop including a first portion and a second portion; a source of alternating voltage, said first loop portion being coupled to said source and having a first network including circuit means for developing an output voltage representative of $$\frac{1}{T_{ti}}$$

a second network coupled to said first network and including first potentiometer means, a first instrument for measuring the ratio of the static air pressure to the dynamic air pressure, said first instrument being coupled to said first potentiometer means for multiplying the input voltage of said second network by $f_3'(M)$, a third and a fourth network coupled in cascade to said second network, said third and fourth networks including respectively second and third potentiometer means; a servo motor for controlling said second and third potentiometer means in accordance with V; said second loop portion being coupled to said source and including fourth potentiometer means coupled to said instrument for developing an output voltage representative of $f_4'(M)$; an impedance element coupling said second loop portion to the fourth network of said first loop portion; a servo amplifier for controlling said servo motor in accordance with the voltage across said impedance element, whereby said second and third potentiometer means are adjusted until the voltage across said impedance element becomes zero; means coupled to said servo motor for indicating the variable V; a second instrument for measuring $P_{si}$, fifth potentiometer means coupled to said first potentiometer means and coupled to said second instrument for positioning said fifth potentiometer means in accordance with $P_{si}$, and an output circuit coupled to said fifth potentiometer means for developing an output voltage representative of $$\frac{\rho}{\rho_0}$$

9. An airborne air data analogue computer for continuously solving the equation $$M^2 f_7(M) = f_4'(M) = \frac{f_3'(M)}{T_{ti}} V^2$$

and for indicating the variable V, wherein M is the Mach number, $f_3'(M)$, $f_7(M)$ and $f_4'(M)$ are functions of M, $T_{ti}$ is the indicated total ambient air temperature, and V the speed of an airplane, and for solving the equation $$\frac{\rho}{\rho_0} = \frac{f_3'(M)}{T_{ti}} P_{si}$$

and for indicating $$\frac{\rho}{\rho_0}$$

when $\rho$ is the density of the ambient air, $\rho_0$ is a standard air density, and $P_{si}$ is the indicated static pressure of the ambient air; said computer comprising a closed loop including a first portion and a second portion; a source of alternating voltage, said first loop portion being coupled to said source and having a first network including circuit means for developing an output voltage representative of $$\frac{1}{T_{ti}}$$

a second network coupled to said first network and including first potentiometer means, a first instrument for measuring the ratio of the static air pressure to the dynamic air pressure, said first instrument being coupled to said first potentiometer means for multiplying the input voltage of said second network by $f_3'(M)$, a third and a fourth network coupled in cascade to said second network, said third and fourth networks including respectively second and third potentiometer means; a servo motor for controlling said second and third potentiometer means in accordance with V; said second loop portion being coupled to said source and including fourth potentiometer means coupled to said instrument for developing an output voltage representative of $f_4'(M)$; an impedance element coupling said second loop portion to the fourth network of said first loop portion; a servo amplifier for controlling said servo motor in accordance with the voltage across said impedance element, whereby said second and third potentiometer means are adjusted until the voltage across said impedance element becomes zero; fifth potentiometer means coupled to said source and to said servo motor for developing an output voltage representative of the variable V; a second instrument for measuring $P_{si}$, sixth potentiometer means coupled to said first potentiometer means and coupled to said second instrument for positioning said sixth potentiometer means in accordance with $P_{si}$, and an output circuit coupled to said sixth potentiometer means for developing an output voltage representative of $$\frac{\rho}{\rho_0}$$

10. An airborne air data analogue computer for continuously solving the equation $$M^2 = \frac{f_3(M)}{T_{ti}} V^2$$

and for indicating the variable V, wherein M is the Mach number, $f_3(M)$ is a predetermined function of M, $T_{ti}$ is the indicated total temperature of the ambient air, and V the speed of an airplane, and for continuously solving the equation $a_t = a_i f_1(M) + f_2(M) + Z_a$ and for indicating $a_t$, wherein $a_t$ is the true angle of attack, $a_i$ the indicated angle of attack, $f_1(M)$ and $f_2(M)$ are predetermined functions of M, and $Z_a$ a boresight adjustment; said computer comprising a closed loop including a first portion and a second portion; a source of alternating voltage; said first loop portion being coupled to said source and having a first network including circuit means for developing an output voltage representative of $$\frac{1}{T_{ti}}$$

a second network coupled to said first network and including first potentiometer means, an instrument for measuring the ratio of the static air pressure to the dynamic air pressure, said instrument being coupled to said first potentiometer means for multiplying the input voltage of said second network by $f_3(M)$, a third and a fourth network coupled in cascade to said second network, said third and fourth networks including respectively second and third potentiometer means, a servo motor for controlling said second and third potentiometer means in accordance with V; said second loop portion being coupled to said source and including fourth potentiometer means coupled to said instrument for developing an output voltage representative of $M^2$; a first impedance element coupling said second loop portion to the fourth network of said first loop portion; a servo amplifier for controlling said servo motor in accordance with the voltage across said first impedance element, whereby said second and third potentiometer means are adjusted until the voltage across said first impedance element becomes zero; means coupled to said servo motor for indicating the variable V; said computer comprising a further channel including fifth potentiometer means coupled to said source, sixth potentiometer means coupled to said source, means coupling said fifth and sixth potentiometer means to said instrument for deriving respectively from said fifth and sixth potentiometer means an output voltage representative of $f_1(M)$ and $f_2(M)$, a second impedance element connected across said sixth potentiometer means having a tap adjustable to introduce a voltage representative of $Z_a$, a third impedance element coupled to the output of said fifth potentiometer means and coupled to the output of said sixth potentiometer means for adding voltages representative of $f_2(M)$ and of $Z_a$, seventh potentiometer means coupled to said third impedance element, a further instrument responsive to $a_i$ for controlling said seventh potentiometer means, and an output circuit coupled to said seventh potentiometer means for developing an output voltage representative of $a_t$.

11. An airborne air data analogue computer for continuously solving the equation $$M^2 = \frac{f_3(M)}{T_{ti}} V^2$$

and for indicating the variable V, wherein M is the Mach number, $f_3(M)$ is a predetermined function of M, $T_{ti}$ is the indicated total temperature of the ambient air, and V the speed of an airplane, and for continuously solving the equation $a_t = a_i f_1(M) + f_2(M) + Z_a$ and for indicating $a_t$, wherein $a_t$ is the true angle of attack, $a_i$ the indicated angle of attack, $f_1(M)$ and $f_2(M)$ are predetermined functions of M, and $Z_a$ a boresight adjustment; said computer comprising a closed loop including a first portion and a second portion; a source of alternating voltage; said first loop portion being coupled to said source and having a first network including circuit means for developing an output voltage representative of $$\frac{1}{T_{ti}}$$

a second network coupled to said first network and including first potentiometer means, an instrument for measuring the ratio of the static air pressure to the dynamic air pressure, said instrument being coupled to said first potentiometer means for multiplying the input voltage of said second network by $f_3(M)$, a third and a fourth network coupled in cascade to said second network, said third and fourth networks including respectively second and third potentiometer means, a servo motor for controlling said second and third potentiometer means in accordance with V; said second loop portion being coupled to said source and including fourth potentiometer means coupled to said instrument for developing an output voltage representative of $M^2$; a first impedance element coupling said second loop portion to the fourth network of said first loop portion; a servo amplifier for controlling said servo motor in accordance with the voltage across said first impedance element, whereby said second and third potentiometer means are adjusted until the voltage across said first impedance element becomes zero; fifth potentiometer means coupled to said servo motor for developing an output voltage representative of the variable V; said computer comprising a further channel including sixth potentiometer means coupled to said source, seventh potentiometer means coupled to said source, means coupling said sixth and seventh potentiometer means to said instrument for deriving respectively from said sixth and seventh potentiometer means an output voltage representative of $f_1(M)$ and $f_2(M)$, a second impedance element connected across said seventh potentiometer means having a tap adjustable to introduce a voltage representative of $Z_a$, a third impedance element coupled to the output of said sixth potentiometer means and coupled to the output of said seventh potentiometer means for adding voltages representative of $f_2(M)$ and of $Z_a$, eighth potentiometer means coupled to said third impedance element, a further instrument responsive to $a_i$ for controlling said eighth potentiometer means, and an output circuit coupled to said eighth potentiometer means for developing an output voltage representative of $a_t$.

12. An analogue computer for continuously developing an output voltage representative of the relative density of ambient air, said computer comprising a first network for developing an output voltage directly proportional to $$\frac{1}{T_{tt}}$$

wherein $T_{tt}$ is the measured total temperature in degrees Kelvin of ambient air, said first network including a first resistor, a second resistor and a source of voltage connected in a closed loop, an output circuit coupled across said second resistor, said first resistor having a resistance which is a substantially linear function of the temperature $T_{tt}$ to be measured within a predetermined temperature range, the combined resistance of said first resistor and of said second resistor being directly proportional to $T_{tt}$, whereby the voltage obtained from said output circuit is directly proportional to $$\frac{1}{T_{tt}}$$

a second network coupled to the output circuit of said first network for multiplying said voltage proportional to $$\frac{1}{T_{tt}}$$

with a function of the Mach number, a third network coupled to said second network for multiplying the voltage developed by said second network with $P_{si}$, wherein $P_{si}$ is the indicated static pressure of the ambient air, and an output circuit for said third network for developing a voltage representative of the relative air density.

13. An electronic analogue computer for continuously computing an equation including an unknown variable term V to the second power, wherein V is the true speed of an airplane, said equation further including at least one term which is a function of $T_{tt}$ which is the measured total temperature in degrees Kelvin of ambient air, and at least another term which is a function of the Mach number evaluated as a function of the ratio of the static pressure of the ambient air to the dynamic pressure of the ambient air, said equation including all of said terms and having a first quantity which must equal a second quantity to satisfy said equation thereby to determine the value of V; said computer comprising a closed loop having a first portion and a second portion; a source of voltage; said first loop portion being arranged to evaluate said first quantity and being coupled to said source, said first loop portion including a first network having a first resistor and a second resistor connected in a closed loop with said source, an output circuit coupled across said second resistor, said first resistor having a resistance which is a substantially linear function of the temperature $T_{tt}$ to be measured within a predetermined temperature range, the combined resistance of said first resistor and of said second resistor being directly proportional to $T_{tt}$, whereby the voltage obtained from said output circuit is directly proportional to $$\frac{1}{T_{tt}}$$

said second loop portion being arranged to evaluate said second quantity and being coupled to said source and including at least another network for evaluating at least another one of said terms; an impedance element coupling said first loop portion to said second loop portion, whereby the voltage across said impedance element must be zero to satisfy said equation; a servo amplifier coupled across said impedance element; and a servo motor coupled to said servo amplifier, said loop including first and second potentiometer means each being adapted to be positioned in accordance with V, and said motor being coupled to both of said potentiometer means for varying in unison said potentiometer means to satisfy said equation.

14. An air data analogue computer for continuously solving the equation $$M^2 f_7(M) \equiv f_4'(M) = \frac{f_3'(M)}{T_{ti}} V^2$$

and for indicating the variable V, wherein M is the Mach number, $f_3'(M)$, $f_7(M)$ and $f_4'(M)$ are functions of M, $T_{ti}$ is the measured total temperature in degrees Kelvin of ambient air, and V the speed of an airplane, and for solving the equations $$\frac{\rho}{\rho_0} = \frac{f_3'(M)}{T_{ti}} P_{si}$$

and for indicating $$\frac{\rho}{\rho_0}$$

where $\rho$ is the density of the ambient air, $\rho_0$ is a standard air density, and $P_{si}$ is the indicated static pressure of the ambient air; said computer comprising a closed loop including a first portion and a second portion; a source of alternating voltage, said first loop portion being coupled to said source and having a first network including a first resistor and a second resistor connected in a closed loop with said source, an output circuit coupled across said second resistor, said first resistor having a resistance which is a substantially linear function of the temperature $T_{ti}$ to be measured within a predetermined temperature range, the combined resistance of said first resistor and of said second resistor being selected to be directly proportional to $T_{ti}$, whereby the voltage obtained from said output circuit is directly proportional to $$\frac{1}{T_{ti}}$$

a second network coupled to said first network and including first potentiometer means, a first instrument for measuring the ratio of the static air pressure to the dynamic air pressure, said first instrument being coupled to said first potentiometer means for multiplying the input voltage of said second network by $f_3'(M)$, a third and a fourth network coupled in cascade to said second network, said third and fourth networks including respectively second and third potentiometer means; a servo motor for controlling said second and third potentiometer means in accordance with V; said second loop portion being coupled to said source and including fourth potentiometer means coupled to said instrument for developing an output voltage representative of $f_4'(M)$; an impedance element coupling said second loop portion to the fourth network of said first loop portion; a servo amplifier for controlling said servo motor in accordance with the voltage across said impedance element, whereby said second and third potentiometer means are adjusted until the voltage across said impedance element becomes zero; means coupled to said servo motor for indicating the variable V; a second instrument for measuring $P_{si}$, fifth potentiometer means coupled to said first potentiometer means and coupled to said second instrument for positioning said fifth potentiometer means in accordance with $P_{si}$, and an output circuit coupled to said fifth potentiometer means for developing an output voltage representative of $$\frac{\rho}{\rho_0}$$

15. An air data analogue computer for continuously solving the equation $$\frac{f_8(M)}{V} = \frac{V}{T_{ti}}$$

wherein V is the speed of an airplane, $f_8(M)$ is a predetermined function of the Mach number M, and $T_{ti}$ is the measured total temperature in degrees Kelvin of ambient air; said computer comprising a closed loop including a first portion and a second portion; a source of alternating voltage; said first loop portion being coupled across said source and having first potentiometer means for developing an output voltage representative of $$\frac{1}{V}$$

a first network coupled to said first potentiometer means and including second potentiometer means, an instrument for measuring an air pressure ratio, said instrument being coupled to said second potentiometer means for multiplying the output voltage of said first potentiometer means by $f_8(M)$; said second loop portion being coupled across said source and including a first resistor and a second resistor connected in a closed loop with said source, said first resistor having a resistance which is a substantially linear function of the temperature $T_{ti}$ to be measured within a predetermined temperature range, the combined resistance of said first resistor and of said second resistor being directly proportional to $T_{ti}$, whereby the voltage obtained across said second resistor is directly proportional to $$\frac{1}{T_{ti}}$$

said second loop portion further including a third potentiometer means connected across said second resistor; a servo motor for controlling said first and said third potentiometer means in accordance with V; an impedance element coupling said second potentiometer means to said third potentiometer means; and a servo amplifier for controlling said servo motor in accordance with the voltage across said impedance element, whereby said first and third potentiometer means are adjusted until the voltage across said impedance element becomes zero.

16. An air data analogue computer for continuously solving the equation $$M^2 = f_3(M) \frac{V^2}{T_{ti}}$$

wherein M is the Mach number, $f_3(M)$ is a function of M, $T_{ti}$ is the indicated total temperature of the ambient air, and V the speed of an airplane; said computer comprising a closed loop including a first portion and a second portion; a source of alternating voltage, said first loop portion being coupled to said source and having a first network including circuit means for developing an output voltage representative of $$\frac{1}{T_{ti}}$$

a second network coupled to said first network and including first potentiometer means, an instrument for measuring an air pressure ratio, said instrument being coupled to said first potentiometer means for multiplying the input voltage of said second network by $f_3(M)$; said second loop portion being coupled to said source and including second potentiometer means coupled to said instrument for developing an output voltage representative of $M^2$; an impedance element coupling said second loop portion to said first loop portion, whereby the voltage across said impedance element must be zero to satisfy said equation; a servo-motor; and means for controlling said servo-motor in accordance with the voltage across said impedance element, said loop including third and fourth potentiometer means each being adapted to be positioned by said servo-motor in accordance with V to satisfy said equation.

17. An air data analogue computer for continuously solving a first equation $$M^2 f_7(M) \equiv f_4'(M) = \frac{f_3'(M) V^2}{T_{ti}}$$

wherein M is the Mach number, $f_3'(M)$, $f_7(M)$ and $f_4'(M)$ are functions of M, $T_{ti}$ is the indicated total ambient air temperature, and V the speed of an airplane, and for continuously solving a second equation $$\frac{\rho}{\rho_0} = \frac{f_3'(M) P_{si}}{T_{ti}}$$

and for indicating $$\frac{\rho}{\rho_0}$$

wherein $\rho$ is the density of the ambient air, $\rho_0$ is a standard air density, and $P_{si}$ is the indicated static pressure of the ambient air; said computer comprising a closed loop including a first portion and a second portion; a source of alternating voltage, said first loop portion being coupled to said source and having a first network including circuit means for developing an output voltage representative of $$\frac{1}{T_{ti}}$$

a second network coupled to said first network and including first potentiometer means, a first instrument for measuring an air pressure ratio, said first instrument being coupled to said first potentiometer means for multiplying the input voltage of said second network by $f_3'(M)$; said second loop portion being coupled to said source and including second potentiometer means coupled to said first instrument for developing an output voltage representative of $M^2$; an impedance element coupling said second loop portion to said first loop portion, whereby the voltage across said impedance element must be zero to satisfy said first equation; a servo-motor; means for controlling said servo-motor in accordance with the voltage across said impedance element, said loop including third and fourth potentiometer means each being adapted to be positioned by said servo-motor in accordance with V to satisfy said first equation; said computer comprising a further channel including a second instrument for measuring $P_{si}$, a fifth potentiometer means coupled to said first potentiometer means and coupled to said second instrument for positioning said fifth potentiometer means in accordance with $P_{si}$, and an output circuit coupled to said fifth potentiometer means for developing an output voltage representative of $$\frac{\rho}{\rho_0}$$

18. An air data analogue computer for continuously solving a first equation $$M^2 f_7(M) = f_4'(M) = \frac{f_3'(M) V^2}{T_{ti}}$$

wherein M is the Mach number, $f_3'(M)$, $f_7(M)$ and $f_4'(M)$ are functions of M, $T_{ti}$ is the indicated total ambient air temperature, and V the speed of an airplane, and for continuously solving a second equation $$a_t = a_i f_1(M) + f_2(M) + Z_a$$

and for indicating $a_t$, wherein $a_t$ is the true angle of attack and $a_i$ the indicated angle of attack, $f_1(M)$ and $f_2(M)$ are functions of M, and $Z_a$ a boresight adjustment; said computer comprising a closed loop including a first portion and a second portion; a source of alternating voltage, said first loop being coupled to said source and having a first network including first circuit means for developing an output voltage representative of $T_{ti}$, a second network coupled to said first network and including first potentiometer means, a first instrument for measuring an air pressure ratio, said first instrument being coupled to said first potentiometer means for multiplying the input voltage of said second network by $f_3'(M)$; said second loop portion being coupled to said source and including second potentiometer means coupled to said first instrument for developing an output voltage representative of $M^2$; a first impedance element coupling said second loop portion to said first loop portion, whereby the voltage across said first impedance element must be zero to satisfy said first equation; a servo-motor; means for controlling said servo-motor in accordance with the voltage across said first impedance element, said loop including third and fourth potentiometer means each being adapted to be positioned by said servo-motor in accordance with V to satisfy said first equation; said computer comprising a further channel including fifth potentiometer means coupled to said source, sixth potentiometer means coupled to said source, means coupling said fifth and sixth potentiometer means to said first instrument for deriving respectively from said fifth and sixth potentiometer means output voltages representative of $f_1(M)$ and $f_2(M)$, a second instrument responsive to $a_t$, seventh potentiometer means coupled to said second instrument, second circuit means coupling said fifth and seventh potentiometer means for multiplying the output voltage of said fifth potentiometer by $a_i$, a second impedance element having a variable tap and coupled to said source for deriving at said tap a voltage representative of $Z_a$, and third circuit means coupling said second impedance element and said fifth, sixth and seventh potentiometer means to an output to provide a voltage representative of the sum of $a_i f_1(M)$, $f_2(M)$ and $Z_a$.

19. An air data analogue computer for continuously solving a first equation $$M^2 f_7(M) = f_4'(M) = \frac{f_3'(M) V^2}{T_{ti}}$$

wherein M is the Mach number, $f_3'(M)$, $f_7(M)$ and $f_4'(M)$ are functions of M, $T_{ti}$ is the indicated total ambient air temperature, and V the speed of an airplane, and for continuously solving a second equation $$\frac{\rho}{\rho_0} = \frac{f_3'(M) P_{si}}{T_{ti}}$$

and for indicating $$\frac{\rho}{\rho_0}$$

wherein $\rho$ is the density of the ambient air, $\rho_0$ is a standard air density, and $P_{si}$ is the indicated static pressure of the ambient air, and for continuously solving a third equation $a_t = a_i f_1(M) + f_2(M) + Za$, and for indicating $a_t$, wherein $a_t$ is the true angle of attack, $a_i$ is the indicated angle of attack, $f_1(M)$ and $f_2(M)$ are functions of M, and $Z_a$ a boresight adjustment; said computer comprising a closed loop including a first portion and a second portion; a source of alternating voltage, said first loop portion being coupled to said source and having a first network including first circuit means for developing an output voltage representative of $T_{ti}$, a second network coupled to said first network and including first potentiometer means, a first instrument for measuring an air pressure ratio, said first instrument being coupled to said first potentiometer means for multiplying the input voltage of said second network by $f_3'(M)$; said second loop portion being coupled to said source and including second potentiometer means coupled to said first instrument for developing an output voltage representative of $M^2$; a first impedance element coupling said second loop portion to said first loop portion, whereby the voltage across said first impedance element must be zero to satisfy said first equation; a servo-motor; means for controlling said servo-motor in accordance with the voltage across said first impedance element, said loop including third and fourth potentiometer means each being adapted to be positioned by said servo-motor in accordance with V to satisfy said first equation; said computer comprising a further channel including a second instrument for measuring $P_{si}$, fifth potentiometer means coupled to said first potentiometer means and coupled to said second instrument for positioning said fifth potentiometer means in accordance with $P_{sl}$, an output circuit coupled to said fifth potentiometer means for developing an output voltage representative of $$\frac{\rho}{\rho_0}$$

said computer comprising a further channel including sixth potentiometer means coupled to said source, seventh potentiometer means coupled to said source, means coupling said sixth and seventh potentiometer means to said first instrument for deriving respectively from said potentiometer means output voltages representative of $f_1(M)$ and $f_2(M)$, a third instrument responsive to $a_l$, eighth potentiometer means coupled to said third instrument, second circuit means coupling said sixth and eighth potentiometer means for multiplying the output voltage of said sixth potentiometer means by $a_l$, a second impedance element having a variable tap and coupled to said source for deriving at said tap the voltage representative of $Z_a$, and third circuit means coupling said second impedance element and said sixth, seventh and eight potentiometer means to an output to provide a voltage representative of the sum of $a_l f_1(M)$, $f_2(M)$ and $Z_a$.

References Cited in the file of this patent

UNITED STATES PATENTS

| | | |
|---|---|---|
| 1,603,210 | Pohl | Oct. 12, 1926 |
| 2,410,651 | Glass | Nov. 5, 1946 |
| 2,714,309 | Redemske | Aug. 2, 1955 |
| 2,775,124 | Gardner et al. | Dec. 25, 1956 |
| 2,825,227 | Sanberg | Mar. 4, 1958 |

FOREIGN PATENTS

| | | |
|---|---|---|
| 722,062 | Germany | June 29, 1942 |

OTHER REFERENCES

Trans. of AIEE (Hornfeck) July 1952, pp. 189 and 190 vol. 71, Part I.

UNITED STATES PATENT OFFICE
CERTIFICATE OF CORRECTION

Patent No. 2,955,761            October 11, 1960

Norman M. Brown, Jr., et al.

It is hereby certified that error appears in the printed specification of the above numbered patent requiring correction and that the said Letters Patent should read as corrected below.

Column 5, line 53, for "factory" read -- factor --; lines 63 to 65, equation 7 should read as shown below instead of as in the patent:

$$M^2 = f_4(M)\alpha \frac{V^2 f_3(M)}{T_{ti}}$$

column 9, line 41, for "29.9″" read -- 29.92″ --; column 10, lines 8 to 10, equation 15 should read as shown below instead of as in the patent:

$$f_4' = M^2 f_7 \alpha \frac{V^2}{T} f_7$$

column 16, line 38, for "comprosing" read -- comprising --; column 21, lines 59 and 60, for "attack and" read -- attack, --; column 22, line 46, the equation should appear as shown below instead of as in the patent:

$$a_t = a_i f_1(M) + f_2(M) + Z_a$$

Signed and sealed this 18th day of April 1961.

(SEAL)
Attest:

ERNEST W. SWIDER            DAVID L. LADD
Attesting Officer            Commissioner of Patents